(12) United States Patent
Ericsson et al.

(10) Patent No.: US 6,298,789 B1
(45) Date of Patent: Oct. 9, 2001

(54) GAS GENERATOR

(75) Inventors: Dan Ericsson, Boras (SE); Pierre Karinthi, Jouy en Josas; Michel Gastiger, Orsay, both of (FR)

(73) Assignees: Autoflator AB, Vargarda (SE); L'Air Liquide SA, Paris (FR)

( * ) Notice: Subject to any disclaimer, the term of this patent is extended or adjusted under 35 U.S.C. 154(b) by 0 days.

(21) Appl. No.: 09/194,239

(22) PCT Filed: May 23, 1997

(86) PCT No.: PCT/EP97/02646

§ 371 Date: Nov. 24, 1999

§ 102(e) Date: Nov. 24, 1999

(87) PCT Pub. No.: WO97/45298

PCT Pub. Date: Dec. 4, 1997

(30) Foreign Application Priority Data

May 24, 1996 (DE) ............................................... 196 21 045

(51) Int. Cl.⁷ ............................. C06D 5/00; B60R 21/26; B60R 21/28
(52) U.S. Cl. ........................ 102/530; 102/531; 280/737; 280/741; 280/740; 149/1; 149/74
(58) Field of Search ......................... 149/1, 74; 280/737, 280/741; 102/530, 531

(56) References Cited

U.S. PATENT DOCUMENTS

| | | | |
|---|---|---|---|
| 3,895,821 | * | 7/1975 | Schotthoefer et al. ............. 280/150 |
| 5,031,932 | * | 7/1991 | Frantom et al. .................... 280/741 |
| 5,078,422 | * | 1/1992 | Hamilton et al. ................... 280/736 |
| 5,131,680 | * | 7/1992 | Coultas et al. ..................... 280/737 |
| 5,263,740 | * | 11/1993 | Frey et al. .......................... 280/737 |
| 5,280,951 | * | 1/1994 | Rizzi et al. ......................... 280/736 |
| 5,330,730 | * | 7/1994 | Brede et al. ........................ 280/736 |
| 5,531,473 | * | 7/1996 | Rink et al. ......................... 280/737 |
| 5,649,720 | * | 7/1997 | Rink et al. ......................... 280/737 |
| 5,762,369 | * | 6/1998 | Mooney et al. .................... 280/741 |
| 5,847,314 | * | 12/1998 | Blumenthal et al. ................. 149/1 |
| 5,857,699 | * | 1/1999 | Rink et al. ......................... 280/737 |
| 5,931,495 | * | 8/1999 | Rink et al. ......................... 280/737 |
| 6,007,097 | * | 12/1999 | Rink et al. ......................... 280/737 |

FOREIGN PATENT DOCUMENTS

| | | |
|---|---|---|
| 4135776 | 5/1993 | (DE) . |
| 0621160 | 10/1994 | (EP) . |
| 2270742 | 3/1994 | (GB) . |
| 96/10496 | 4/1996 | (WO) . |

\* cited by examiner

Primary Examiner—Charles T. Jordan
Assistant Examiner—Glenda L. Sanchez
(74) Attorney, Agent, or Firm—Dilworth & Barrese LLP

(57) ABSTRACT

A gas generator for air bags having a container holding a combustible gas mixture and fitted with a closure which opens into a combustion chamber fitted with a gas outlet in which the gas mixture is ignited by an ignition device. To provide a fast-reacting ignition device and generate a controllable flow of pressurized gas at a relatively low temperature, the container is mainly filled with a pressurized inert gas and contains 0.1 to 2.0% vol. of a hydrocarbon and 0.5 to 10% vol. of a gaseous oxidizing agent. On being actuated, the ignition device opens the container closure, ignites the gas mixture flowing into the combustion chamber and maintains combustion by the continuous supply of energy.

23 Claims, 1 Drawing Sheet

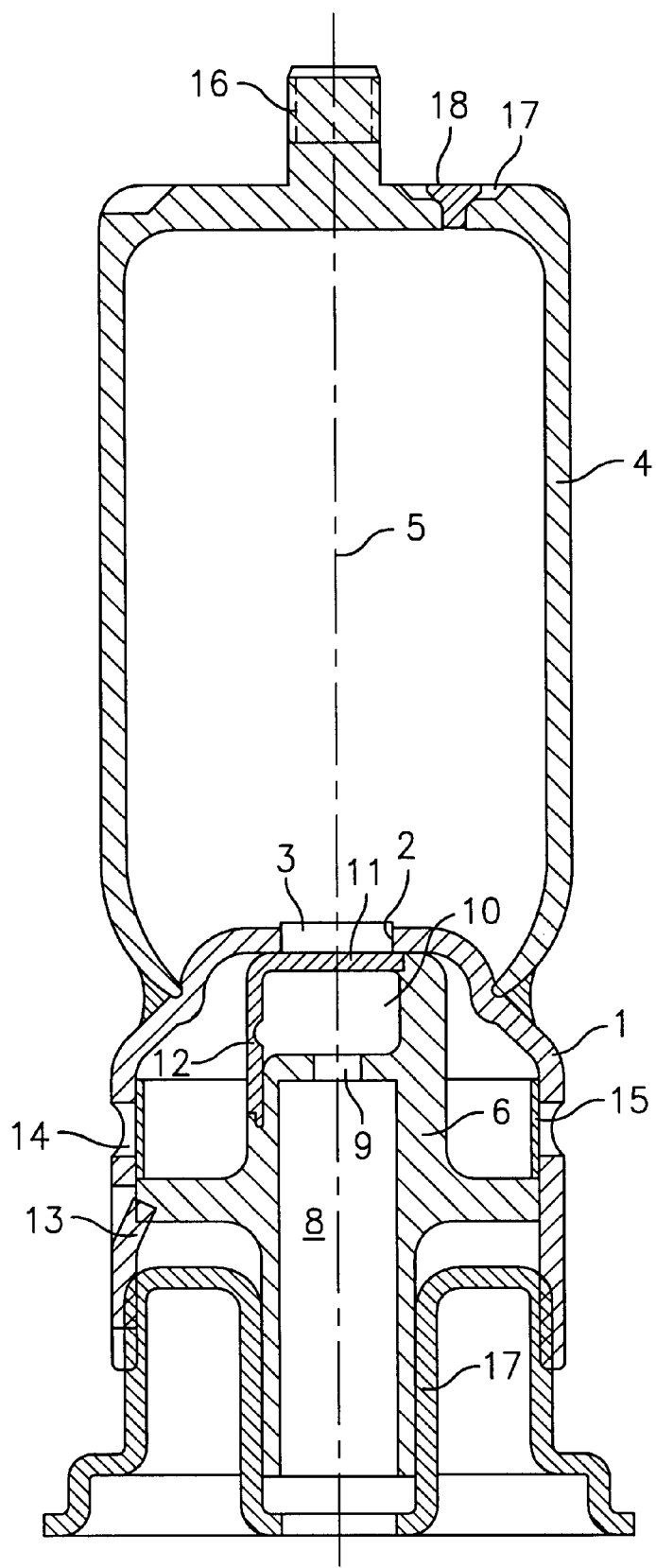

GAS GENERATOR

BACKGROUND OF THE INVENTION

The invention refers to a gas generator, preferably for an inflatable airbag for the protection of vehicle occupants, consisting of a container holding a combustible gas mixture and provided with a closure which opens into a combustion chamber provided with a as outlet in which the gas mixture is ignited by an ignition device.

In a gas generator of said kind which is known from DE 41 35 776 C1, the container contains a liquid gas consisting of a mixture of one or several short-chain hydrocarbons and dinitrogen monoxide as an oxidizing agent, which is injected into the combustion chamber after the initiation of the gas generator and is ignited therein by an ignition device with an ignition charge. Thereby the ignition clouds and the hot combustion gases ignite the liquid gas which vaporizes and volatilizes due to the occurring expansion in the combustion chamber. In the known gas generator, the ignited gas mixture shows an explosion-like reaction so that gas pressure peaks destroying the combustion chamber may occur. Thus, in order to reduce the high reaction velocity, in the known gas generator an inert gas of carbon dioxide and/or xenon is added to the gas mixture in an amount of preferably 10 through 80% in weight.

The known gas generator is not only detrimental because of the high reaction velocity which is only mitigated by the addition of inert gas, but also because of the use of liquid gas which has to evaporate prior to its ignition so that the supply of additional energy is neccessary. Said evaporation is time-consuming. Furthermore, the high concentration of fuel gas results in a very high temperature of the combustion gases, which is an additional risk if leaks should occur.

SUMMARY OF THE INVENTION

Consequently, it is the object of the invention to provide a gas generator of the kind mentioned at the beginning which, after the initiation of the ignition device, shows a fast reaction, generates a controllable flow of pressurized gas at a relatively low temperature and also is completely safe.

In order to obtain an even better and more efficient combustion, a catalytic coating (for instance Pt or Rh) can be provided at sections of the combustion chamber.

According to the invention, said problem is solved by the fact that the container is mainly filled with a pressurized inert gas and contains 0.1 to 5.0% vol. of a gaseous fuel and 0.5 through 20% vol. of a gaseous oxidizing agent, and that the ignition device, on being actuated, opens the container closure, ignites the gas flowing into the combustion chamber and maintains combustion by a continuous supply of energy. The upper limit values are chosen so that at no time an explosive mixture is obtained.

Due to the low concentration of the amounts of combustible gas and gaseous oxidizing agent in the total mixture of gases, the combustion of the gas mixture flowing into the combustion chamber is not automatically maintained after the initiating ignition so that the ignition device has to maintain the combustion of the gas mixture in the combustion chamber. Nevertheless, the inventive gas generator generates a gas flow with the required flow rate, as the gas flowing into the combustion chamber is ignited immediately and needs not to be evaporated first, in order to form an ignitable mixture. Due to the high amount of inert gas in the gas mixture and due to the use of a catalyst, the temperature of the combustion gas can be kept low, for instance in the range of 400° C. or less.

According to a preferred embodiment it is provided that at least half of the gaseous fuel is hydrocarbon or hydrogen. The combustible gas may consist of $CH_4$, $C_2H_6$, $C_3H_8$, $C_2H_{10}$, or $H_2$ or of a mixture thereof, but preferably consists of $CH_4$ or $C_3H_8$.

The gaseous oxidizing agent advantageously consists of $O_2$, $N_2O$ or $H_2O_2$.

Advantageously, the oxidizing agent is $O_2$.

The inert gas preferably is Ar, but also $N_2$ may be used.

According to a particularly favorable embodiment it is provided that the gaseous fuel contains 0 through 70% vol., preferably approximately 50% vol., of saturated hydrocarbon, and in addition an unsaturated hydrocarbon, for instance $C_2H_2$ or $C_2H_4$.

The addition of unsaturated hydrocarbons results in a better ignition of the gas mixture so that it is used for the initiation and the acceleration of the combustion of the gas mixture which contains alkanes and oxidizing agents.

Advantageously, the pressure of the gas mixture in the container amounts to 100 through 300 bar and preferably to approximately 180 through 280 bar.

The ignition device may consist of a solid or liquid pyrotechnic charge arranged externally of the container.

As an ignition device also a laser can be used.

BRIEF DESCRIPTION OF THE DRAWING

One embodiment of the invention is explained in detail in the following by means of the drawing, the sole FIGURE of which is a sectional view through the gas generator.

DESCRIPTION OF THE PREFERRED EMBODIMENTS

The gas generator consists of a bell-shaped housing part 1 which, at its upper end, is provided with an opening 2 closed by a sealing disk 3. The edge of a pressure container 4 is bonded through welding with the bell-shaped housing part 1 such that the center line of the opening 2 coincides with the center line 5 of the pressure container.

In the bell-shaped housing part 1 there are held parts 6, 7 the center part 6 of which has a cylindrical chamber 8 which is used for accommodating a pyrotechnic charge. The chamber 8 is connected with the combustion chamber 10 via a bore 9 in its top wall. The combustion chamber 10 is closed by an angular closure element from which the upper leg 11 extends in parallel to the top wall of the bell-shaped housing part 1 being provided with the bore 2 and supports the sealing disk 3 in the inactive state. By means of a nose, the other leg 12 of the closure element comes into engagement with an undercut of the insert part 6, so that the closure element is locked in the represented inactive position in its closing position.

The insert part 6, in its shown position, is locked by the insert part 7. The insert parts 6 and 7 are positively locked with the bell-shaped housing part, wherein a tongue 13 may be bent inwards from the casing of the bell-shaped housing part 1 for fixing and locking purposes.

At its upper end, the pressure container 4 is provided with a threaded pin 16 for its fastening and with an opening 17 which is closed by a screw plug 18 and through which it may be filed.

The pressure container 4 preferably has a volume of approximately 350 cm$^3$ and is filled with a gas mixture which may be under a pressure of 180 through 280 bar (usually appromixately 230 bar).

In the chamber 8 there may be disposed for instance a pyrotechnic charge of 3–8 g, depending upon the gas mixture, which may consist of a solid or a liquid. The pyrotechnic charge contains a combustible substance and an oxidizing agent which preferably have a stoichiometric ratio, and may have a combustion period corresponding to the discharge period of the container.

The pyrotechnic charge may for instance be ignited by an electric ignition device.

When the pyrotechnic charge is ignited, the combustion gases enter the combustion chamber 10 through the bore 9 so that due to the pressure being created in the combustion chamber 10 the leg 12 is pivoted to the left by releasing Its locking and thereby releases the opening 2. During the flowing-in of the gas mixture into the combustion chamber 10 the pyrotechnic charge maintains the combustion process. The combustion gases; exit through the bore 14 in the bell-shaped housing part 1 and therefrom for instance flow into an inflatable airbag.

In stead of a pyrotechnic charge, the chamber 8 may also accommodate a laser which then initiates and maintains the ignition.

The openings or bores 14 in the bell-shaped housing part 1 are closed by a network 15 in the shown manner, which consists of a woven wire cloth made of Pt or Rh or of wires with the respective mesh width, which are coated with Pt or Rh. The network 5 is of an annular shape.

What is claimed is:

1. A gas generator, preferably for an inflatable airbag for the protection of vehicle occupants comprising a container (4) holding a combustible gas mixture and provided with a closure (3, 11) which opens into a combustion chamber (10) provided with a gas outlet (14) in which the gas mixture is ignited by an ignition device, characterized in that the container (4) is mainly filled with pressurized inert gas and contains 0.1 to 5.0% vol. of gaseous fuel and 0.5 to 20% vol. of a gaseous oxidizing agent, the ignition device, on being actuated, opens the contained closure (11), ignites the gas mixture flowing into the combustion chamber (10), and maintains combustions by a continuous supply of energy and continuous ignition within said combustion chamber (10), and concentration of said gaseous fuel and oxidizing agent is, at all times, below an explosive level in said container (4).

2. The gas generator according to claim 1, characterized in that the gaseous fuel amounts to 0.2 to 0.5% vol. and the amount of the gaseous oxidizing agent amounts to 1 to 3% vol. of the gas mixture.

3. The gas generator according to claim 1, characterized in that at least half of the gaseous fuel is a gaseous alkane.

4. The gas generator according to claims 3, characterized in that the alkane is $CH_4$, $C_2H_6$, $C_3H_8$ or $C_4H_{10}$.

5. The gas generator according to claim 4, characterized in that the alkane is $C_3H_8$.

6. The gas generator according to claims 1, characterized in that the gaseous oxidizing agent is $O_2$, $N_2O$ or $H_2O_2$.

7. The gas generator according to claim 6, characterized in that the oxidizing agent is $O_2$.

8. The gas generator according to any one of claims 1, characterized in that the inert gas is Ar.

9. The gas generator according to claim 1, characterized in that the gaseous fuel contains 0 to 70% vol. of hydrocarbon, and in addition an unsaturated hydrocarbon.

10. The gas generator according to claim 9, characterized in that the unsaturated hydrocarbon is $C_2H_2$.

11. The gas generator according to claim 1, characterized in that the gas mixture in the container is subject to a pressure of 100 through 300 bar.

12. The gas generator according to claim 11, characterized in that the gas mixture in the container is subject to a pressure of 180 through 280 bar.

13. The gas generator according to claim 1, characterized in that the ignition device is a pyrotechnic charge consisting of a solid or a liquid.

14. The gas generator according to claim 1, characterized in that the ignition device is a laser.

15. The gas generator according to claim 1, characterized in that, apart from fuel, the container also comprises air.

16. The gas generator according to claim 1, characterized in that the combustion chamber (10) has outlets (14) which are covered by a porous structure, as e.g. a network (15) and that this structure comprises a catalytic substance.

17. The gas generator according to claim 16, comprising a catalytic coating of Pt or Rh.

18. The gas generator according to claim 1, wherein temperature of combustion gas is maintained in the range of 400° C. or less.

19. The gas generator according to claim 1, structured and arranged such that combustion of gas mixture flowing into the combustion chamber (10) is not automatically maintained after initiating ignition, such that the ignition device must maintain combustion of the gas mixture in the combustion chamber (10) while, at the same time, gas flow into the combustion chamber (10) is maintained at a required rate and the gas flowing into the combustion chamber (10) is ignited immediately without evaporation.

20. The gas generator according to claim 18, structured and arranged such that combustion of gas mixture flowing into the combustion chamber (10) is not automatically maintained after initiating ignition, such that the ignition device must maintain combustion of the gas mixture in the combustion chamber (10) while, at the same time, gas flow into the combustion chamber (10) is maintained at a required flow rate and the gas flowing into the combustion chamber (10) is ignited immediately without evaporation.

21. The gas generator according to claim 9, wherein the gaseous fuel contains approximately 50% vol. of hydrocarbon, and additionally $C_2H_2$ or $C_2H_4$.

22. The gas generator according to claim 3 wherein the pyrotechnic charge is a mixture of fuel and oxidizing agents in a stoichiometric relation.

23. A gas generator, preferably for an inflatable airbag for the protection of vehicle occupants, comprising a container (4) holding a combustible gas mixture and provided with a closure (3,11) which opens into a combustion chamber (10) provided with a gas outlet (14) in which the gas mixture is ignited by an ignition device, characterized in that the container (4) is mainly filled with pressurized inert gas and contains 0.1 to 5.0% vol. of a gaseous fuel and 0.5 to 20% vol. of a gaseous oxidizing agent, the ignition device, on being actuated, opens the container closure (11), ignites the gas mixture flowing into the combustion chamber, and maintains combustion by a continuous supply of energy, and the container closure is constituted by an angular closure element comprising an upper leg (11) of the angular closure element and which is structured and arranged to be pivoted into its open position after the ignition of the pyrotechnic charge acting upon another leg (12) of the angular closure element.

* * * * *